United States Patent
Mishima et al.

(10) Patent No.: US 12,465,900 B2
(45) Date of Patent: Nov. 11, 2025

(54) METHOD FOR PRODUCING CELLULOSE NANOFIBER CAPSULE

(71) Applicant: FUKUOKA UNIVERSITY, Fukuoka (JP)

(72) Inventors: Kenji Mishima, Fukuoka (JP); Shinichi Tokunaga, Fukuoka (JP); Kento Ono, Fukuoka (JP)

(73) Assignee: Fukuoka University, Fukuoka (JP)

( * ) Notice: Subject to any disclaimer, the term of this patent is extended or adjusted under 35 U.S.C. 154(b) by 485 days.

(21) Appl. No.: 17/922,607

(22) PCT Filed: May 13, 2021

(86) PCT No.: PCT/JP2021/018299
§ 371 (c)(1),
(2) Date: Nov. 1, 2022

(87) PCT Pub. No.: WO2021/230332
PCT Pub. Date: Nov. 18, 2021

(65) Prior Publication Data
US 2023/0166229 A1 Jun. 1, 2023

(30) Foreign Application Priority Data
May 14, 2020 (JP) ................................. 2020-085560

(51) Int. Cl.
*B01J 13/08* (2006.01)
(52) U.S. Cl.
CPC ..................................... *B01J 13/08* (2013.01)
(58) Field of Classification Search
CPC ......... B01J 13/08; B01J 13/04; A61K 9/5042; A61K 9/5089; A23P 10/30
See application file for complete search history.

(56) References Cited

U.S. PATENT DOCUMENTS

| 2010/0316684 A1 | 12/2010 | Daniels |
| 2013/0122071 A1 | 5/2013 | Cathala et al. |
| 2013/0340328 A1* | 12/2013 | Yoon ...................... B03B 9/005 |
| | | 44/505 |

FOREIGN PATENT DOCUMENTS

| CN | 105837851 A | 8/2016 |
| JP | 2010-527332 A | 8/2010 |

(Continued)

OTHER PUBLICATIONS

Mishima et al., "Production method of cellulose nanofiber-coated capsules", Fukuoka University New Technology Presentation Meetings, Fukuoka University, pp. 1-23 (2021).

(Continued)

*Primary Examiner* — Jiangtian Xu
(74) *Attorney, Agent, or Firm* — Ajay A. Jagtiani; Miles & Stockbridge P.C.

(57) ABSTRACT

A method for producing a cellulose nanofiber capsule according to the present invention includes forming a Pickering emulsion by irradiating a mixture containing cellulose nanofibers, water, and fluid carbon dioxide with ultrasonic waves in a closed container; and facilitating encapsulation using cellulose nanofibers from the Pickering emulsion by opening the closed container. The present invention enables encapsulation using the cellulose nanofibers from a Pickering emulsion that does not contain an organic solvent, for example, and is useful in the technical fields of pharmaceutical agents, foods, and cosmetics, for example.

6 Claims, 8 Drawing Sheets

(56) References Cited

FOREIGN PATENT DOCUMENTS

| JP | 2013-534561 A | 9/2013 | |
|---|---|---|---|
| JP | 2019181398 A * | 10/2019 | ............. E02B 1/006 |
| KR | 10-2019-0127150 A | 11/2019 | |
| WO | WO-2015059179 A1 * | 4/2015 | ............... A23D 9/06 |
| WO | 2015/076191 A1 | 5/2015 | |

OTHER PUBLICATIONS

Search Report and Written Opinion received in parent PCT Application No. PCT/JP2021/018299.

* cited by examiner

[FIG.1]
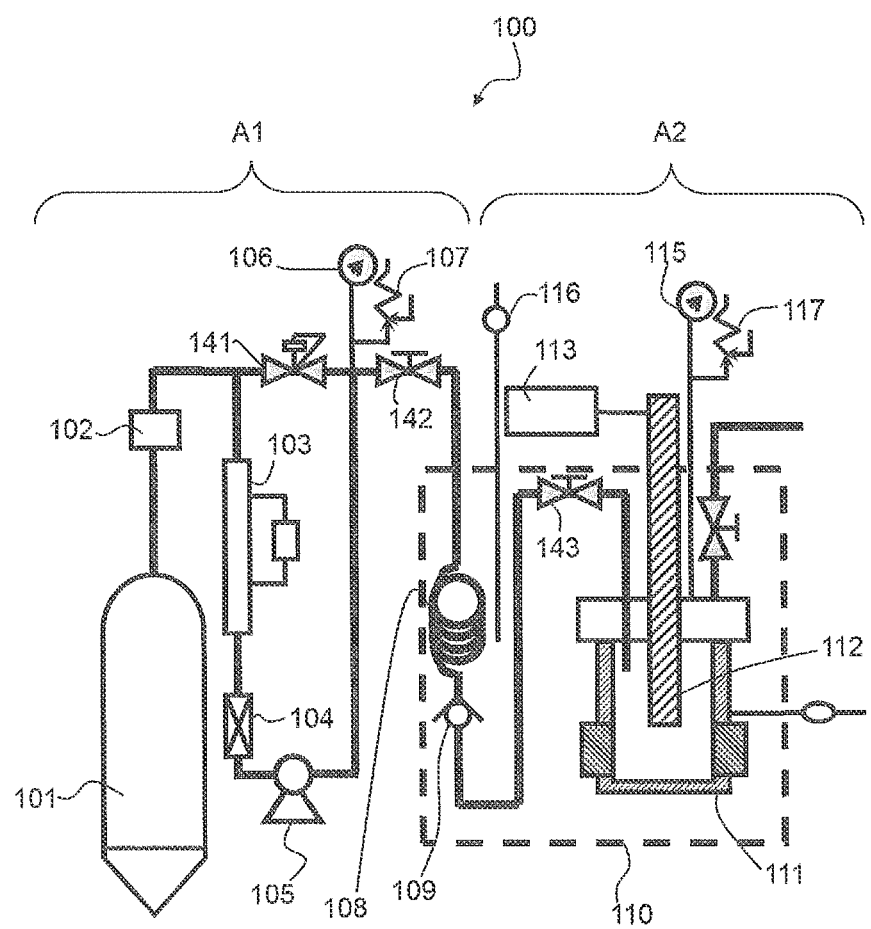

[FIG.2]
(a)
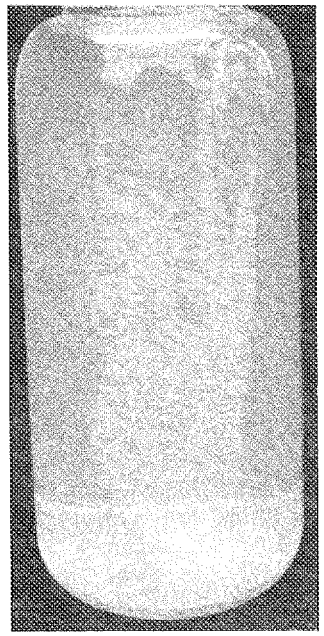
Aqueous CNF suspension
before being introduced
into the container
(b)
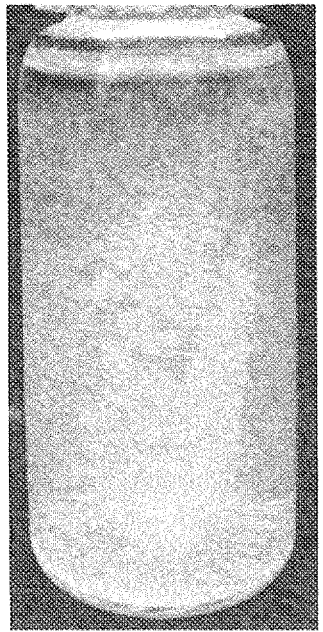
Liquid containing the CNF capsules
that were collected from the container
after experiment
(Average particle size: 180 μm)

[FIG.3]
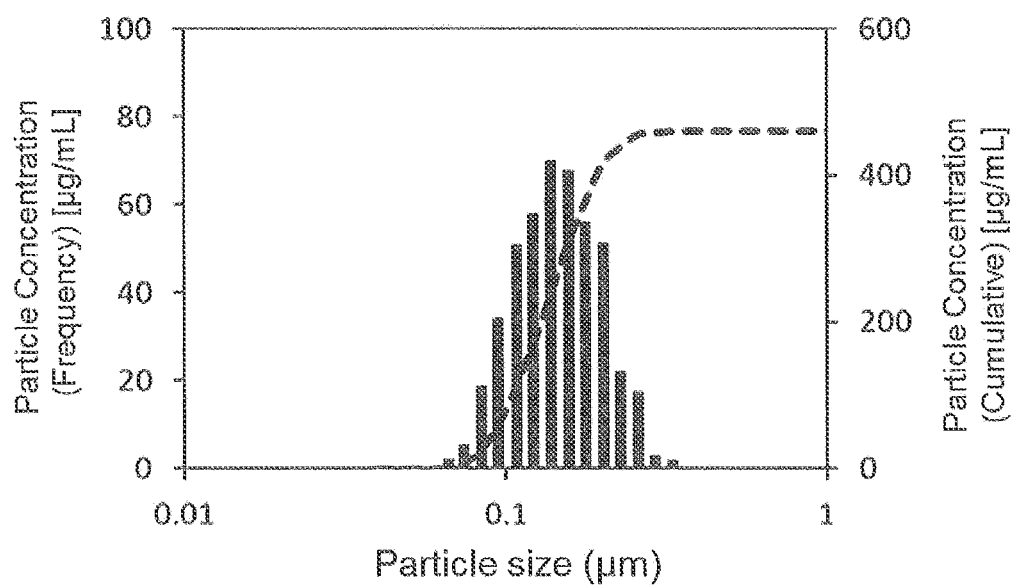

[FIG.4]
(a)
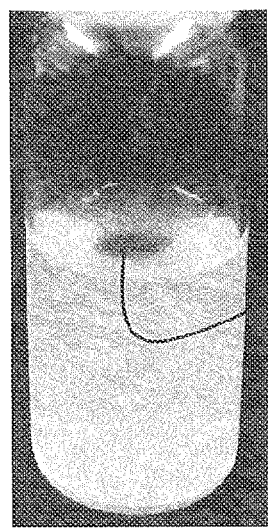
Aqueous CNF suspension containing brominated copper phthalocyanine before being introduced into the closeable container
(b)
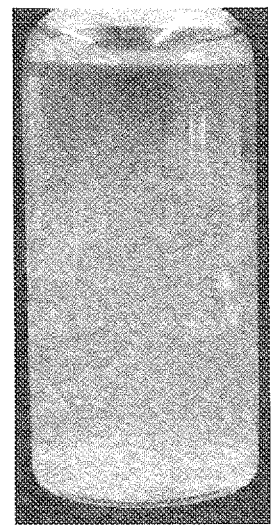
Liquid containing the CNF capsules enclosing brominated copper phthalocyanine and collected from the closeable container after the experiment
(Average particle size: 200 μm)

[FIG.5]
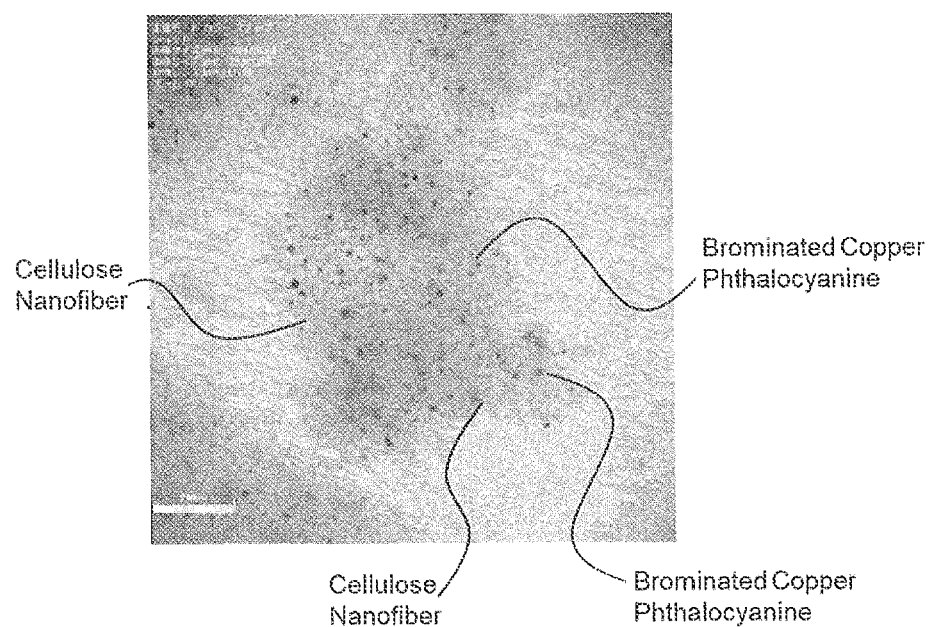

[FIG.6]
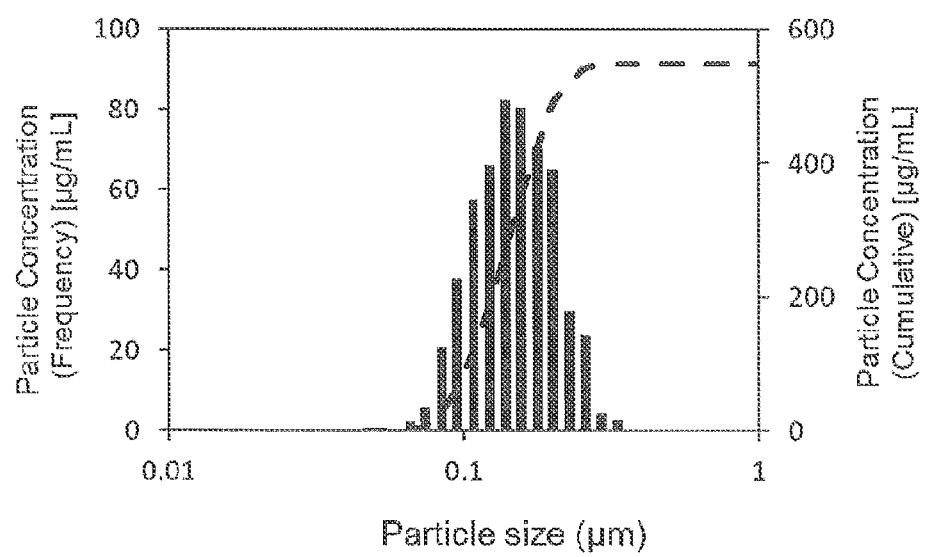

[FIG.7]
 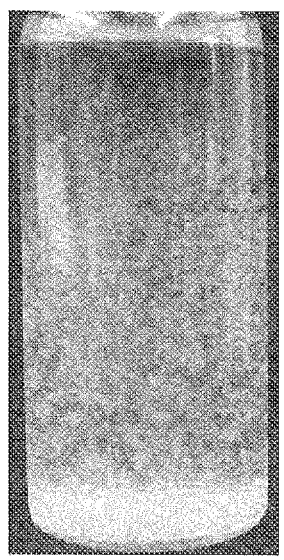
(a) Aqueous CNF suspension containing phycocyanin before being introduced into the container
(b) Liquid containing the CNF capsules enclosing phycocyanin and collected from the container after the experiment
(Average particle size: 200 μm)

[FIG.8]
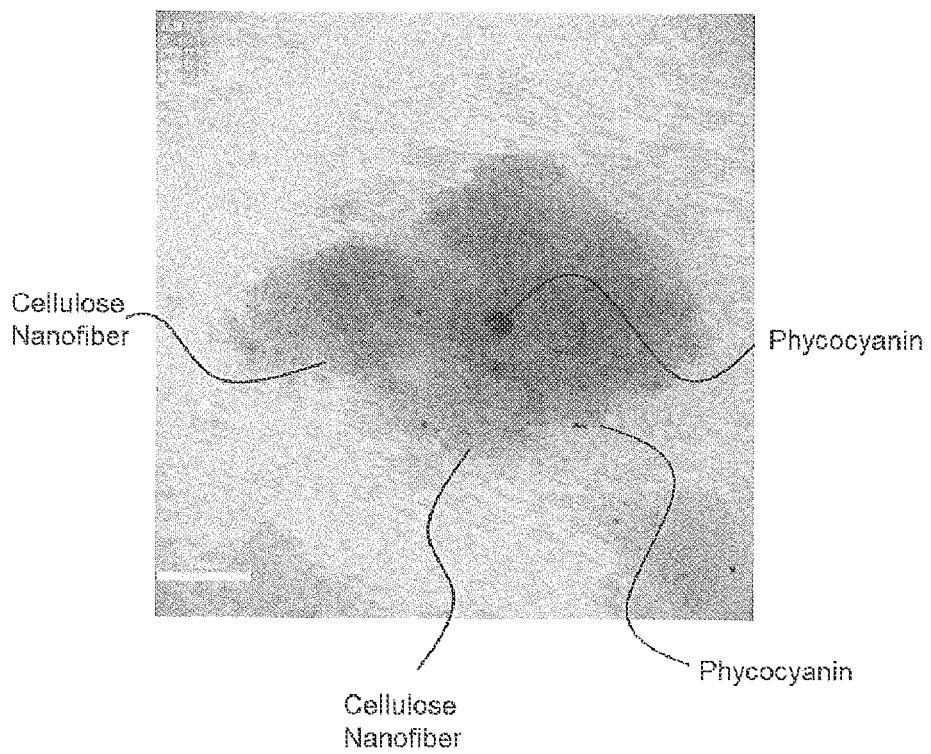

METHOD FOR PRODUCING CELLULOSE NANOFIBER CAPSULE

TECHNICAL FIELD

The present invention relates to a method for producing a cellulose nanofiber capsule, and more specifically to a method for producing a cellulose nanofiber capsule utilizing the formation of a Pickering emulsion.

BACKGROUND ART

In recent years, capsules obtained utilizing Pickering emulsions, which are emulsions stabilized using solid particles adsorbed on the liquid-liquid interface, have been gaining attention as emulsifier-free emulsion capsules for their applications and potential for cosmetics, medical products, or pharmaceutical compositions, and various production methods have been proposed.

Meanwhile, techniques for encapsulating various substances using cellulose nanofibers utilizing a cellulose nanofiber Pickering emulsion have been proposed.

Patent Document 1 discloses a method for producing capsules through a step of producing an oil-in-water Pickering emulsion, and a step of filling a pressure-resistant vessel with the Pickering emulsion and an aerosol, or a step of filling, with the Pickering emulsion, a container, other than the pressure resistant vessel, for producing bubbles when dispensing the Pickering emulsion, for example. However, according to the method disclosed in Patent Document 1, cellulose nanofiber capsules can be produced using the Pickering emulsion, but it is difficult to apply the cellulose nanofiber capsules to biological systems in particular, because harmful triglycerides are used in the step of preparing a liquid oil phase.

Patent Document 2 discloses a method for producing a capsule through a step of preparing cellulose nanocrystals and a step of mixing the cellulose nanocrystals into an aqueous phase of a composition in order to stabilize an emulsion. According to the method disclosed in Patent Document 2, cellulose nanofiber capsules are produced by mixing the prepared cellulose nanocrystals at an oil-water ratio of 30:70, and irradiating the resulting mixture with ultrasonic waves. However, hexadecane, which is harmful to the human body, is used in an oil phase in this method as well, and thus it is difficult to apply the cellulose nanofiber capsules to biological systems.

Patent Document 3 discloses a method for preparing a Pickering emulsion by mixing an aqueous suspension of cellulose nanofibers prepared using a nano-miniaturization method (such as an aqueous counter-collision method) with which only the interaction between fibers is cleaved using only the fluid energy of a fluid medium such as water as a driving source, with a water-insoluble organic solvent. According to the method disclosed in Patent Document 3, an organic solvent is not used in the method for preparing cellulose nanofibers, but an organic solvent needs to be used to prepare the emulsion and thus it is difficult to apply the resulting emulsion to biological systems.

Although various methods for producing cellulose nanofiber capsules utilizing a Pickering emulsion have been reported in this manner, an organic solvent needs to be used in all of the methods. Meanwhile, in order to apply a cellulose nanofiber capsule to cosmetics, medical products, or pharmaceutical compositions, there is demand for establishing a production technique in which no organic solvent is used in processes for producing cosmetics, medical products, or pharmaceutical compositions. Therefore, a technique for producing a cellulose nanofiber capsule utilizing a safe Pickering emulsion has not been sufficiently established yet, and thus further development is desired.

RELATED ART DOCUMENTS

Patent Documents

Patent Document 1: JP 2010-527332A
Patent Document 2: JP 2013-534561A
Patent Document 3: WO 2015/076191

SUMMARY OF INVENTION

Problem to be Solved by the Invention

The present invention aims to resolve the above issues, and it is an object thereof to provide a method for producing a cellulose nanofiber that can be produced through the formation of a Pickering emulsion and applies to organisms without using an organic solvent.

Means for Solving the Problem

The present invention provides a method for producing a cellulose nanofiber capsule, which comprises:
  forming a Pickering emulsion by irradiating a mixture containing cellulose nanofibers, water, and fluid carbon dioxide with ultrasonic waves in a closed container; and
  facilitating encapsulation using the cellulose nanofibers from the Pickering emulsion by opening the closed container.

In an embodiment, the cellulose nanofibers include a cellulose nanofiber obtained by physically defibrating a plant material.

In an embodiment, the mixture contains a core substance.

In another embodiment, the core substance is a hydrophilic substance, a hydrophobic substance, or a water-insoluble substance.

In an embodiment, the mixture does not contain an organic solvent.

In an embodiment, the ultrasonic irradiation is performed by directly irradiating the mixture with ultrasonic waves from an ultrasonic probe disposed in the closed container.

Effects of the Invention

According to the present invention, it is possible to efficiently produce a cellulose nanofiber capsule using a Pickering emulsion. The cellulose nanofibers obtained using the production method according to the present invention can avoid the use of an organic solvent in the production process. Thus, an organic solvent will not remain in the obtained cellulose nanofiber capsule. Such cellulose nanofiber capsules can be provided with higher safety even in applications to the human body, such as DDSs (drug delivery systems).

BRIEF DESCRIPTION OF DRAWINGS

FIG. 1 is a schematic diagram showing an example of an apparatus for producing a cellulose nanofiber capsule using a method for producing the cellulose nanofiber capsule according to the present invention.

FIG. 2(a) is a photograph showing a cellulose nanofiber suspension, which was used in Example 1, before the cellulose nanofiber suspension was introduced into a closeable container, and FIG. 2(b) is a photograph showing liquid containing cellulose nanofiber capsules that were obtained in Example 1 and collected from the closeable container after the experiment.

FIG. 3 is a graph showing the particle size distribution and the particle concentration of particles contained in liquid obtained after aggregates of the cellulose nanofiber capsules (cellulose nanofiber microparticles) produced in Example 1 were completely disaggregated.

FIG. 4(a) is a photograph showing a cellulose nanofiber suspension containing brominated copper phthalocyanine, which was used in Example 2, before this suspension was introduced into a closeable container, and FIG. 4(b) is a photograph showing liquid containing cellulose nanofiber capsules enclosing brominated copper phthalocyanine that were obtained in Example 2 and collected from the closeable container after the experiment.

FIG. 5 is a photograph obtained by observing cellulose nanofiber capsules enclosing brominated copper phthalocyanine produced in Example 2 using a 3D measurement laser microscope.

FIG. 6 is a graph showing the particle size distribution and the particle concentration of particles contained in liquid obtained after aggregates of the cellulose nanofiber capsules (cellulose nanofiber microparticles) produced in Example 2 were completely disaggregated.

FIG. 7(a) is a photograph showing a cellulose nanofiber suspension containing phycocyanin, which was used in Example 3, before this suspension was introduced into a closeable container, and FIG. 7(b) is a photograph showing liquid containing cellulose nanofiber capsules enclosing phycocyanin that were obtained in Example 3 and collected from the closeable container after the experiment.

FIG. 8 is a photograph obtained by observing cellulose nanofiber capsules enclosing phycocyanin produced in Example 3 using a 3D measurement laser microscope.

DESCRIPTION OF EMBODIMENTS

The following describes the present invention in detail.
(Method for Producing Cellulose Nanofiber Capsules)

In the method for producing a cellulose nanofiber capsule according to the present invention, first, a mixture containing cellulose nanofibers, water, and fluid carbon dioxide is irradiated with ultrasonic waves in a closed container.

The term "cellulose nanofibers" (will be referred to as "CNF" hereinafter) in the present invention refers to a fibrous structure derived from a plant. Many plants have cell walls as the extracellular matrix. The cell wall is approximately composed of cellulose (50 mass %), hemicellulose (20 mass % to 30 mass %), and lignin (20 mass % to 30 mass %), for example. CNF can be obtained by isolating cellulose by removing, from such a plant material, hemicellulose and lignin through high-temperature treatment using steam in an alkaline solution, for example, and cleaving bonds between cellulose molecules and disentangling entanglements of cellulose molecules by performing predetermined chemical or physical treatment on the cellulose. In an embodiment, CNF is composed of cellulose fibers having a diameter of 1 nm to 100 nm and an aspect ratio of 100 or more.

Examples of the plant material that is a raw material of the CNF include trees obtained through natural or industrial afforestation; wood, wheat straw, rice straw, corn cobs and stems, and bagasse obtained as industrial waste; and combinations thereof.

Such a plant material is processed into CNF using various methods known to those skilled in the art. Examples of the method with which CNF is obtained from a plant material include: a miniaturization method (ACC (Aqueous Counter Collision) method) in which the pulp of the plant material and water are introduced into a tank provided with a nozzle, and cellulose molecules in the pulp are caused to collide with each other by spraying the pulp and water from the nozzle at high pressure; a method in which the plant material is miniaturized through charge repulsion by oxidizing the primary alcohols present at the C6 positions of the cellulose molecules contained in the plant material using a TEMPO (2,2,6,6-tetramethylpiperidine 1-oxyl) catalyst; and a method in which the plant material is hydrolyzed using microorganisms derived from the genus *Trichoderma* or an enzyme produced by the same microorganisms. In the present invention, in order to form a CNF Pickering emulsion in a step of producing the CNF capsules, it is preferable to use a material containing the physically defibrated CNF as in the above ACC method.

The amount of the CNF introduced into the closed container may be determined as appropriate depending on the type of plant material from which CNF is derived, the particle size of CNF capsules to be produced, and the production amount, for example, and is preferably 0.5% (w/v) to 10% (w/v), and more preferably 1% (w/v) to 3% (w/v) concerning the volume of the closed container. If the amount of CNF introduced is less than 0.5% (w/v), a Pickering emulsion may not be appropriately formed in the closed container, making it difficult to efficiently produce desired CNF capsules. If the amount of CNF introduced is more than 10% (w/v), an excessive amount of CNF may be present in the closed container, making it difficult to produce CNF capsules having a uniform particle size.

Purified water is preferably used from the viewpoint of avoiding contamination of CNF capsules to be produced, for example. Water may be purified using any appropriate method known to those skilled in the art, such as reverse osmosis, deionization, distillation, filtration, ultrafiltration, or the like, for example. Ion-exchanged water, pure water, or ultrapure water is used, for example.

Although the amount of water introduced into the closed container is not limited as long as it is an amount by which water and high-pressure fluid carbon dioxide form a water-carbon dioxide two phase system in the container and the system can contain the produced CNF capsules, the amount of water introduced into the closed container is preferably 10% (w/v) to 40% (w/v), and more preferably 15% (w/v) to 30% (w/v) concerning the volume of the closed container. Because water is contained in the closed container in such a range, a CNF Pickering emulsion can be formed appropriately in the container.

Fluid carbon dioxide refers to carbon dioxide in a state in which the interface can form between fluid carbon dioxide and water, and a carbon dioxide-water two phase separation system can form. In the present invention, the fluid carbon dioxide can function as an alternative to an organic solvent, and thus use of organic solvents can be avoided. Fluid carbon dioxide may be in a supercritical state, a subcritical state, or a liquid state, and these states may be changed by controlling pressure or temperature.

The term "supercritical state" refers to the state of a substance at a temperature and a pressure above the critical point of the substance, and has the diffusibility of gas and the solubility of liquid. Fluid carbon dioxide in the supercritical state is referred to as supercritical carbon dioxide. Supercritical carbon dioxide refers to carbon dioxide at a temperature above the critical temperature (Tc: 31.1° C.) and a pressure above the critical pressure (Pc: 7.38 MPa). A supercritical fluid is a fluid whose temperature and pressure are above the critical temperature and the critical pressure and that has a high density, and is a fluid preferably having a density of 200 kg/m$^3$ to 900 kg/m$^3$, preferably having a viscosity of $10^{-5}$ Pa·s to $10^{-4}$ Pa·s, preferably having a diffusion coefficient of $10^{-8}$ m$^2$/s to $10^{-7}$ m$^2$/s, and/or preferably having a thermal conductivity of $10^{-3}$ W/m$^2$·K to $10^{-1}$ W/m$^2$·K.

The term "subcritical state" refers to the state of a substance in a region slightly below the critical point. A subcritical fluid is a fluid in the liquid state in a temperature range lower than the critical temperature and at a pressure higher than a vapor pressure curve, and a fluid preferably having a density of 500 kg/m$^3$ to 1100 kg/m$^3$, preferably having a viscosity of $10^{-4}$ Pa·s to $10^{-3}$ Pa·s, preferably having a diffusion coefficient of $10^{-10}$ m$^2$/s to $10^{-9}$ m$^2$/s, and/or preferably having a thermal conductivity of 0.08 W/m·K to 0.10 W/m·K.

In contrast, when the fluid carbon dioxide contained in the closed container is in the liquid state, the fluid carbon dioxide refers to carbon dioxide in the liquid state at a pressure higher than an atmospheric pressure (0.1 MPa) and a temperature lower than the supercritical temperature or the subcritical temperature under a pressure higher than the vapor pressure curve.

The supercritical state, the subcritical state, or the liquid state may be changed by controlling temperature and pressure, and the fluid in the closed container may be in the supercritical state, the subcritical state, or the liquid state in a process in the production method according to the present invention. Therefore, in this specification, the wording "supercritical carbon dioxide is used" does not necessarily exclude the subcritical state or the liquid state (in particular, under high pressure), for example.

In an embodiment of the present invention, the mixture may contain a core substance. The core substance is a substance to be enclosed in the CNF capsule obtained (a substance to be enclosed). Any one of the hydrophilic substances (e.g., water-soluble substances), hydrophobic substances (e.g., lipophilic substances), and water-insoluble substances can be used as an example of the core substance. Also, examples of the core substance include substances used as active ingredients in pharmaceutical agents, food additives, nutritional supplements, cosmetics, and the like. Examples of hydrophilic substances that are suitable as a core substance include, but are not necessarily limited to, phenylalanine, phycocyanin, hyaluronic acid, xanthan gum, gelatin, aspartic acid, arginine, polyethylene glycol, and α-tocopherol, and combinations thereof. Examples of hydrophobic substances that are suitable as a core substance include, but are not necessarily limited to, phthalocyanine, mesalazine, levofloxacin, cyclodextrin, cyclosporine, carbamazepine, and phenytoin, and combinations thereof. Examples of water-insoluble substances that are suitable as a core substance include, but are not necessarily limited to, silica particles, metal particles (e.g., metal particles such as iron nanoparticles, copper nanoparticles, and zinc nanoparticles), oils and fats (e.g., oils and fats such as salad oil, soybean oil, sesame oil, cocoa butter, and lard), macromolecular particles (e.g., macromolecular particles such as polystyrene particles, latex particles, and PLGA (poly (lactic-co-glycolic acid)) nanoparticles), and pigments (e.g., pigments such as graphite particles, titanium particles, cobalt particles, disazo yellow particles, and quinacridone red), and combinations thereof.

The amount of the core substance introduced into the closed container may be determined as appropriate depending on the amount of CNF introduced, the particle size of CNF capsules to be produced, and the production amount, for example, and the amount of the core substance introduced into the closed container is preferably 0.01 parts by mass to 3 parts by mass, and more preferably 0.1 parts by mass to 1 part by mass with respect to 1 part by mass of the amount of CNF introduced into the closed container. If the amount of the core substance is less than 0.01 parts by mass, the amount of the core substance that can be encapsulated using the CNF is small with respect to the CNF, and thus there are cases where it is difficult for the obtained CNF capsules to fully exhibit various functions of the core substance. If the amount of the core substance introduced is more than 3 parts by mass, the amount of the core substance is too large with respect to the CNF present in the closed container, and thus there are cases where the core substance cannot be sufficiently encapsulated using the CNF.

Examples of the closed container for storing the mixture when irradiating the mixture with ultrasonic waves include an autoclave, a pressure-resistant cell, and a high-pressure cell of a supercritical apparatus.

In the present invention, once the CNF and water, and the core substance, if necessary, are introduced into the closed container (without adding fluid carbon dioxide), the CNF is dispersed in water, resulting in a CNF suspension, for example. Then, when fluid carbon dioxide is added into the container, CNF may be adsorbed on the interface between water and carbon dioxide in the water-carbon dioxide two-phase system. As a result of irradiating the resulting mixture with ultrasonic waves thereafter, the CNF functions as a surfactant in the water-carbon dioxide two-phase system, and thus a Pickering emulsion can be formed.

Ultrasonic irradiation can be performed by activating an ultrasonic probe (e.g., an ultrasonic transducer (horn)) arranged in a component (e.g., the closed container (e.g., a high-pressure cell in the supercritical apparatus)) that generates ultrasonic vibration at a frequency of 15 to 400 kHz, preferably at the frequency of 20 kHz, for example. The electrical energy amplified to 20 kHz by a solid-state power supply (power source) can be converted by a converter into longitudinal mechanical vibration, and the converted mechanical vibration can be transmitted to the probe (this is called ultrasonic vibration), for example. Ultrasonic vibration becomes pressure waves and may cause cavitation. The term "cavitation" refers to a phenomenon in which formation and attenuation of countless extremely small bubbles continue due to pressure locally decreasing in a solution (fluid). Ultrasonic irradiation can be performed by preferably mounting a horn transducer in the high-pressure cell, or by mounting a Langevin transducer outside the high-pressure cell. If an ultrasonic transducer at 20 kHz, 500 W, and an amplitude of 18.3 μm is used, for example, ultrasonic irradiation is preferably performed for 75 seconds to 250 seconds, and more preferably performed for 150 seconds to 200 seconds, and when the ultrasonic irradiation is performed within the above range, the efficiency of forming a CNF Pickering emulsion can be improved.

Ultrasonic irradiation can be performed while keeping the temperature and pressure at which fluid carbon dioxide can be present in the closed container. The pressure that can be set in the closed container is 5.0 MPa to 12.0 MPa, and preferably 7.0 MPa to 9.0 MPa, for example. When the pressure is within the above range, the CNF Pickering emulsion can be more efficiently formed. The temperature that can be set in the closed container is 10° C. to 70° C., and preferably 30° C. to 50° C., for example. When the temperature is within the above range, the CNF Pickering emulsion can be more efficiently formed.

Note that the addition of any organic solvent to the mixture is not specifically required when subjecting the mixture to ultrasonic irradiation. Preferably, the mixture does not contain an organic solvent in consideration of the CNF capsules obtained being able to be used in cosmetics, medical products, or pharmaceutical composition products.

A Pickering emulsion is formed by irradiating a mixture containing cellulose nanofibers, water, and fluid carbon dioxide, and a core substance, if necessary, with ultrasonic waves in the closed container as described above.

In the present invention, the closed container is then opened so as to facilitate encapsulation of the core substance using the CNF from the Pickering emulsion.

The closed container is opened specifically by reducing the pressure of the container. When high-pressure carbon dioxide regulated for forming the Pickering emulsion is discharged from the closed container, the CNF Pickering emulsion maintains a particulate structure through intricate entanglement between fibers in the CNF, and if the core substance is contained, the CNF Pickering emulsion encloses the core substance to form CNF capsules, and the CNF capsules are dispersed in an aqueous phase remaining in the closed container. These CNF capsules can be easily collected from the closed container together with liquid in the aqueous phase under an atmospheric pressure.

Cellulose nanofiber (CNF) capsules can be produced in this manner.

(Apparatus for Producing Cellulose Nanofiber Capsules)

The method for producing CNF capsules according to the present invention can be carried out using an apparatus designed to include: a closeable container containing a mixture; a means for supplying fluid carbon dioxide to the closeable container; a means for irradiating the closeable container with ultrasonic waves; and a means for discharging fluid carbon dioxide from the closeable container, for example. An apparatus used in a conventional supercritical technology can be applied, for example. The following describes a specific example of such an apparatus in order to produce CNF capsules.

FIG. 1 is a schematic diagram showing an example of an apparatus for producing the cellulose nanofiber capsules using the method for producing the cellulose nanofiber capsule according to the present invention.

An apparatus 100 shown in FIG. 1 is constituted by a booster portion A1 for supplying carbon dioxide at a high pressure, and a CNF capsule production portion A2 that irradiates the mixture containing the CNF with ultrasonic waves in the closeable container, and the booster portion A1 and the CNF production portion A2 can be separated from each other at a stop valve 142 serving as the boundary.

In the booster portion A1, the pressure of carbon dioxide can be increased by a booster pump 105 for increasing the pressure of liquid carbon dioxide. The booster portion A1 is provided with a cylinder 101 that supplies carbon dioxide to the booster pump 105. A cylinder equipped with a siphon filled with liquid carbon dioxide may be used as a source for supplying liquid carbon dioxide.

A drying pipe 102 filled with a drying agent is provided between the cylinder 101 and the booster pump 105. As a result of liquid carbon dioxide from the cylinder 101 passing through the drying pipe 102, moisture is removed from the liquid carbon dioxide.

A cooling unit 103 is provided on the downstream side of the drying pipe 102. The cooling unit 103 is filled with ethylene glycol, for example, and is cooled such that ethylene glycol has a temperature of approximately 260 K. Liquid carbon dioxide from which moisture has been removed using the drying agent while passing through the drying pipe 102 is cooled by ethylene glycol in the cooling unit 103 and supplied to the booster pump 105.

Also, a filter 104 is provided between the cooling unit 103 and the booster pump 105. The filter 104 removes impurities such as dust, and can prevent impurities from entering the booster pump 105.

Carbon dioxide that has passed through the filter 104 is supplied to the booster pump 105. A cooling device (not shown) may be mounted on a head portion of the booster pump 105 in order to prevent vaporization of the liquid carbon dioxide.

The booster portion A1 is provided with a pressure regulating valve 141. Pressure in the system of the booster portion A1 and the CNF capsule production portion A2 can be set to any pressure by the pressure regulating valve 141.

The booster portion A1 is provided with a pressure gauge 106. Pressure in the system of the booster portion can be measured by the pressure gauge 106. The pressure gauge 106 is provided with an upper limit contact output terminal, and can be set to turn off the power source of the booster pump 105 at a specified pressure.

The supply of carbon dioxide to the CNF capsule production portion can be regulated by the stop valve 142 arranged between the booster portion A1 and the CNF capsule production portion A2.

Further, in order to ensure safety, a safety valve 107 may be provided between the booster portion A1 and the CNF capsule production portion A2.

In FIG. 1, the CNF capsule production portion A2 is installed in a constant temperature water bath 110. The water temperature in the constant temperature water bath 110 is controlled using a temperature controller (not shown) within a range of ±0.1° C., for example. A temperature measurement portion 116 may be provided in order to measure the temperature in the constant temperature water bath 110.

A closeable container 111 is disposed in the constant temperature water bath 110 in the production apparatus 100 shown in FIG. 1. It is preferable that the closeable container 111 is a high-pressure cell, for example, and has a heat resistance and pressure resistance. Ultrasonic irradiation is performed in a state in which the closeable container 11 is closed (closed container) and the closed container contains CNF, the core substance, fluid carbon dioxide, and water. An ultrasonic probe 112 such as an ultrasonic transducer (horn) is provided in the closeable container 11. The electrical energy, which is amplified to, for example, 20 kHz by an ultrasonic vibration power source 113, is converted into longitudinal mechanical vibration by a converter (not shown), and the converted mechanical vibration is transmitted to the ultrasonic probe 112 (ultrasonic vibration). The ultrasonic vibration generated by the ultrasonic probe 112 becomes pressure waves, and the mixture in the container 111 may be irradiated with the pressure waves. Ultrasonic irradiation is performed in this manner in the closeable container 111 in the state in which the container 111 is closed, and a Pickering emulsion can be formed by CNF adsorbed on the interface between water and carbon dioxide.

The fluid carbon dioxide can be supplied to the closeable container 111 as follows. Liquid carbon dioxide supplied from the stop valve 142 may be turned into a fluid in the constant temperature water bath 110 by the time the fluid carbon dioxide is supplied to the closeable container 111. The liquid carbon dioxide supplied from the stop valve 142 is introduced into the closeable container 111 through a heater 108, a check valve 109, and a stop valve 143 that are installed in the constant temperature water bath 110. The heater 108 can heat liquid carbon dioxide to turn the liquid carbon dioxide into a fluid. The check valve 109 is provided in order to prevent backflow of the fluid. The stop valve 143 can regulate the supply of fluid carbon dioxide to the closeable container 111.

The closeable container 111 is provided with a pressure gauge 115, and the pressure gauge 115 can measure the pressure in the closeable container 11.

Also, a safety valve 117 is installed on the downstream side of the closeable container 111, and the safety valve 117 can prevent explosion caused by an increase in the pressure in the closeable container 111.

In the CNF capsule production portion A2, after the ultrasonic irradiation, the pressure in the closeable container 111 is reduced by the pressure regulating valve 141 to an atmospheric pressure or less, the Pickering emulsion formed by the CNF adsorbed on the interface between water and carbon dioxide maintains a particulate structure through intricate entanglement between fibers in the CNF, and if the core substance is contained, the CNF Pickering emulsion encloses the core substance to form CNF capsules, and the CNF capsules are dispersed in an aqueous phase remaining in the container. After the pressure is reduced, the fluid carbon dioxide is discharged to the outside of the closeable container 111.

The CNF capsules obtained in this manner have a particle size of 10 μm to 500 μm, preferably have a particle size of 50 μm to 400 μm, and more preferably have a particle size of 100 μm to 300 μm, for example, although the particle size of the CNF capsules may depend on the type of CNF, the type of core substance (e.g., whether the core substance is a hydrophilic substance or a hydrophobic substance), and the like. The particle size (particle diameter) of the CNF capsules can be measured through dynamic light scattering, for example.

A filtration step or the like may also be performed as needed in order to obtain CNF capsules having a particle size distribution that falls within a desired range, remove impurities, and sterilize the CNF capsules, or the like.

Further, the solution containing the CNF capsules may be lyophilized. As a result, the CNF capsules can be made suitable for storage until the CNF capsules are used.

In the production method according to the present invention, it is possible to produce CNF capsules by forming a Pickering emulsion by CNF adsorbed on the interface between water and carbon dioxide, only using water and carbon dioxide without using an organic solvent harmful to organisms, such as hexane. Because the CNF capsules obtained in this manner do no come into contact with a harmful organic solvent during the production process, there is no concern that residual organic solvent may enter the human body even when the CNF capsules are used on the human body. Based on this, the CNF capsules formed using a Pickering emulsion that is safe for the human body can be used for various applications. Further, the present invention enables mass production because an extremely large interface between water and carbon dioxide formed during ultrasonic irradiation is used as a Pickering emulsion formation field.

The CNF capsule produced using the production method according to the present invention can be used in various fields such as pharmaceutical agents, foods, and cosmetics. Such CNF capsules can be used in cosmetics, medical products, pharmaceutical compositions, or the like.

EXAMPLES

Hereinafter, the present invention will be described using examples.

However, the present invention is not limited to these examples. Note that the CNF capsule production apparatus 100 shown in FIG. 1 was used in these examples.

Example 1: Production of CNF Microparticles (E1)

First, ultrapure water and an aqueous suspension of CNF derived from conifer (manufactured by Chuetsu Pulp & Paper Co., Ltd.; purity is 1.03%) were introduced into the closeable container 111 with a volume of 150 mL in the CNF capsule production apparatus 100 shown in FIG. 1. Then, 89 g of carbon dioxide ($\rho_{CO2}$=0.742) was sent from the carbon dioxide cylinder 101 into the closeable container 111 in a state in which the temperature of the constant temperature water bath 110 was set to a predetermined temperature, and the container 111 was closed so that the inside of the container 111 reached a high pressure state (6.8 MPa). Thereafter, ultrasonic waves were emitted at a frequency of 20 kHz and an amplitude of 30% (18.3 μm) from the ultrasonic probe 112 for 125 seconds. After a CNF Pickering emulsion was formed in the container 111, the container 111 was opened by performing a pressure reduction operation, and CNF microparticles, which were the CNF capsules, were then collected from the container 111 together with the solution.

The above procedure was performed under the conditions that the water volume was 27 mL, the aqueous CNF suspension volume was 3 mL, the temperature was 25° C., and ultrasonic irradiation was performed five times (for 25 seconds each time), and it was confirmed that the CNF microparticles (E1) were obtained in this manner. Images of the aqueous CNF suspension before being introduced into the closeable container, and a liquid containing the CNF microparticles (E1) collected from the closeable container after the above-mentioned production were captured by a camera, and the particle size thereof in the solution was measured using a laser analysis particle size distribution analyzer (SALD-2000 manufactured by Shimadzu Corporation).

As shown in FIG. 2, the aqueous CNF suspension (FIG. 2($a$)) before being introduced into the closeable container was a liquid in which the CNF was uniformly dispersed, whereas particles corresponding to the CNF microparticles (E1) were dispersed in a manner that was clearly different from that in FIG. 2($a$) in the liquid containing the CNF capsules that were collected from the closeable container after the experiment was performed, and the CNF capsules were formed in the liquid. Also, the CNF microparticles (E1) produced in this example had an average particle size of 180 μm.

Then, the dispersion liquid containing the CNF microparticles (E1) was subjected to ultrasonic treatment for 5 minutes so as to completely disaggregate aggregates of the particles (E1), and the particle size distribution and particle concentration of the particles contained in the obtained liquid (E1b) were measured through Dynamic Light Scattering (DLS) performed by a laser diffraction particle size distribution analyzer (SALD-7500 manufactured by Shimadzu Corporation). FIG. 3 shows the results thereof. Also, the average particle size of the particles contained in the liquid (E1b) was 121 nm, and the particle concentration (cumulative) thereof was 459 μg/mL.

As shown in FIG. 3, it was found that the CNF capsules (CNF microparticles (E1)) produced in this example had an average particle size of 180 μm, but the CNF capsules were particles (secondary particles) formed through aggregation of minute particles (primary particles) that had a particle size of somewhat exceeding 100 nm (0.1 μm) and had a comparatively narrow particle size distribution.

Example 2: Production of CNF Capsules (E2) Enclosing Hydrophobic Particles

First, ultrapure water, an aqueous suspension of CNF derived from conifer, and brominated copper phthalocyanine (hydrophobic particles) were introduced into the closeable container 111 with a volume of 150 mL in the CNF capsule production apparatus 100. Then, 89 g of carbon dioxide ($\rho_{CO2}$=0.742) was sent from the carbon dioxide cylinder 101 into the closeable container 111 in a state in which the temperature of the constant temperature water bath 110 was set to a predetermined temperature such that the inside of the container 111 reached a high pressure state (6.8 MPa). Thereafter, ultrasonic waves were emitted at a frequency of 20 kHz and an amplitude of 30% (18.3 μm) from the ultrasonic probe 112 for 125 seconds. After a CNF Pickering emulsion was formed in the container 111, the container 111 was opened by performing a pressure reduction operation, and the CNF capsules were then collected from the container 111 together with the solution.

The above procedure was performed under the conditions that the water volume was 27 mL, the aqueous CNF suspension volume was 3 mL, the amount of brominated copper phthalocyanine was 0.01 g, the temperature was 25° C., and ultrasonic irradiation was performed five times (for 25 seconds each time). It was confirmed that CNF capsules (E2) enclosing brominated copper phthalocyanine were obtained. Images of the aqueous CNF suspension containing brominated copper phthalocyanine before being introduced into the closeable container, and a liquid containing the CNF capsules enclosing brominated copper phthalocyanine and collected from the closeable container after experiment were captured by a camera, and the particle size thereof in the solution was measured in the same manner as in Example 1. Also, the morphology of the CNF capsules enclosing brominated copper phthalocyanine was measured using a 3D measurement laser microscope (OLS4100 manufactured by Olympus Corporation).

As shown in FIG. 4, the aqueous CNF suspension (FIG. 4(a)) containing brominated copper phthalocyanine before being introduced into the closeable container was a liquid in which the CNF was uniformly dispersed (here, brominated copper phthalocyanine, which is hydrophobic particles, was disposed on the liquid in FIG. 4(a)), whereas blue-green CNF capsules (E2) originating from brominated copper phthalocyanine were dispersed in a manner that was clearly different from that in FIG. 4(a) in the liquid containing the CNF capsules enclosing brominated copper phthalocyanine and collected from the closeable container after the experiment, and the CNF capsules were formed in the liquid (FIG. 4(b)). Also, the CNF microparticles (E2) produced in this example had an average particle size of 200 μm. Further, as shown in FIG. 5, observation of the CNF capsules (E2) produced in this example using the 3D measurement laser microscope revealed that the outer circumferences of the brominated copper phthalocyanine minute particles were surrounded by the CNF.

Then, the dispersion liquid containing the CNF microparticles (E2) was subjected to ultrasonic treatment for 5 minutes so as to completely disaggregate aggregates of the particles (E2), and the particle size distribution and particle concentration of the particles contained in the obtained liquid (E2b) were measured through Dynamic Light Scattering (DLS) performed by a laser diffraction particle size distribution analyzer (SALD-7500 manufactured by Shimadzu Corporation). FIG. 6 shows the results thereof. Also, the average particle size of the particles contained in the liquid (E2b) was 144 nm, and the particle concentration (cumulative) thereof was 549 μg/mL.

As shown in FIG. 6, it was found that the CNF capsules (CNF microparticles (E2)) produced in this example had an average particle size of 200 μm, but the CNF capsules were particles (secondary particles) formed through aggregation of minute particles (primary particles) that had a particle size of somewhat exceeding 100 nm (0.1 μm) and had a comparatively narrow particle size distribution.

Example 3: Production of CNF Capsules (E3) Enclosing Hydrophilic Particles

First, ultrapure water, an aqueous suspension of CNF derived from conifer, and phycocyanin (hydrophilic particles) were introduced into the closeable container 111 with a volume of 150 mL in the CNF capsule production apparatus 100. Then, 89 g of carbon dioxide ($\rho_{CO2}$=0.742) was sent from the carbon dioxide cylinder 101 into the closeable container 111 in a state in which the temperature of the constant temperature water bath 110 was set to a predetermined temperature such that the inside of the container 111 reached a high pressure state (6.8 MPa). Thereafter, ultrasonic waves were emitted at a frequency of 20 kHz and an amplitude of 30% (18.3 μm) from the ultrasonic probe 112 for 125 seconds. After a CNF Pickering emulsion was formed in the container 111, the container 111 was opened by performing a pressure reduction operation, and the CNF capsules were then collected from the container 111 together with the solution.

The above procedure was performed under the conditions that the water volume was 27 mL, the aqueous CNF suspension volume was 3 mL, the amount of phycocyanin was 0.01 g, the temperature was 25° C., and ultrasonic irradiation was performed five times (for 25 seconds each time). It was confirmed that CNF capsules (E3) enclosing phycocyanin were obtained Images of the aqueous CNF suspension containing phycocyanin before being introduced into the closeable container, and a liquid containing the CNF capsules (E3) enclosing phycocyanin and collected from the closeable container after experiment were captured by a camera, and the particle size thereof in the solution was measured in the same manner as in Example 1. Also, the morphology of the CNF capsules enclosing phycocyanin was measured using a 3D measurement laser microscope (OLS4100 manufactured by Olympus Corporation).

As shown in FIG. 7, the aqueous CNF suspension (FIG. 7(a)) containing phycocyanin before being introduced into the closeable container was a pale blue liquid in which CNF and phycocyanin were uniformly dispersed, whereas the CNF capsules (E3) were dispersed in a manner that was clearly different from that in FIG. 7(a) in the liquid containing the CNF capsules enclosing phycocyanin and collected from the closeable container after the experiment, and the CNF capsules were formed in the liquid (FIG. 7(b)). Also, the CNF microparticles (E3) produced in this example had an average particle size of 200 μm. Further, as shown in FIG. 8, observation of the CNF capsules (E3) produced in this example using the 3D measurement laser microscope revealed that the outer circumferences of the phycocyanin minute particles were surrounded by the CNF.

INDUSTRIAL APPLICABILITY

The present invention is useful in the technical fields of pharmaceutical agents, foods, and cosmetics, for example.

REFERENCE SIGNS LIST

100 Production apparatus
101 Cylinder
102 Drying pipe
103 Cooling unit
104 Filter
105 Booster pump 105
106 Pressure gauge
107 Safety valve
108 Heater
109 Check valve
110 Constant temperature water bath
111 Closeable container
112 Ultrasonic probe
115 Pressure gauge
116 Temperature measurement portion
117 Safety valve
141 Pressure regulating valve
142, 143 Stop valve

The invention claimed is:

1. A method for producing a cellulose nanofiber capsule, comprising:
    forming a Pickering emulsion by irradiating a mixture containing cellulose nanofibers, water, and fluid carbon dioxide with ultrasonic waves in a closed container; and
    facilitating encapsulation using the cellulose nanofibers from the Pickering emulsion by opening the closed container.

2. The method according to claim 1, wherein the cellulose nanofibers include a cellulose nanofiber obtained by physically defibrating a plant material.

3. The method according to claim 1, wherein the mixture further contains a core substance.

4. The method according to claim 3, wherein the core substance is a hydrophilic substance, a hydrophobic substance, or a water-insoluble substance.

5. The method according to claim 1, wherein the mixture does not contain an organic solvent.

6. The method according to claim 1, wherein the ultrasonic irradiation is performed by directly irradiating the mixture with ultrasonic waves from an ultrasonic probe disposed in the closed container.

* * * * *